3,692,701
GROUP VIII METALS ON TIN-CONTAINING
SUPPORTS DEHYDROGENATION CATALYSTS
E. O. Box, Jr., Bartlesville, Okla., assignor to
Phillips Petroleum Company
No Drawing. Filed July 15, 1970, Ser. No. 55,213
Int. Cl. B01j 11/08, 11/22
U.S. Cl. 252—466 B                      6 Claims

ABSTRACT OF THE DISCLOSURE

Longevity of catalyst composites comprising supported Group VIII metal compounds is improved by incorporation of a tin compound into the support prior to calcination of the support. After calcining of the support, the Group VIII metal components are incorporated by conventional procedures. The resulting catalysts are especially useful in dehydrogenation processes and, in addition to improved longevity, can be repeatedly regenerated to a conversion activity commensurate with fresh catalysts.

This invention relates to catalysts and to the catalytic dehydrogenation of organic compounds.

The dehydrogenation of organic compounds is well known. While noncatalytic thermal dehydrogenation of organic compounds is known, the use of such methods is limited because of the extensive undesirable side reactions which take place. Thus, a great number of catalytic processes have been developed in order to minimize side reaction activity and improve conversion and selectivity to desired products. Materials which have been proposed as dehydrogenation catalytic agents include Group VIII metal compounds, e.g., noble metal compounds. Generally, such catalytic agents as the Group VIII metal compounds have been proposed in combination or association with a carrier or support material such as alumina, silica, and the like. The Group VIII metal compound-containing catalytic agents are characterized by high dehydrogenation activity and selectivity. Such materials, however, are subject to deactivation particularly by coke laydown, and can lose their activity very quickly, e.g., in a matter of minutes. Hence, although the selectivity and activity of the Group VIII metal, particularly the noble metal, catalytic agents in dehydrogenation processes is excellent, the cost of such agents in relation to their catalytic activity and the need for frequent regeneration has inhibited their acceptance in commercial dehydrogenation applications.

I have now discovered that the activity, longevity and regenerability of Group VIII metal compound-containing catalytic agents can be substantially improved by modifying certain catalytic support or carrier materials with a tin compound, thereafter calcining the tin-modified carrier, and subsequently adding to the calcined tin-modified carrier catalytic amounts of selected Group VIII metal compounds. The finished catalytic agents or catalyst composites are particularly useful in the process for the catalytic dehydrogenation of organic compounds which comprises contacting the organic feedstock under dehydrogenation conditions with catalytic agents of the invention in the presence of steam and the absence of oxygen. Thus, the invention contemplates a novel catalyst carrier and its method of preparation, a catalyst composition and its method of preparation, and a process for the dehydrogenation of organic compounds.

An essential feature of the invention is the use of a tin-modified support or carrier for the Group VIII metal catalytic materials. Thus, according to the invention, a catalyst support material selected from the group consisting of alumina, flame-hydrolyzed alumina, HF-treated alumina, silica, magnesia, zirconia, alumino-silicates, Group II aluminate spinels, and mixtures thereof, is modified by the incorporation therein of at least one tin compound prior to calcination of said support and the deposition thereon of the Group VIII metal catalytic material after calcination. Preferred supports include the Group II aluminate spinels, in particular zinc aluminate spinel.

As noted, an essential feature of the invention is the requirement that the tin compound be incorporated with the support material prior to calcination of the support. The tin compound can be added to the support material in a conventional manner such as deposition from solution, ball mill mixing, volatilization, plasma spraying, and the like. When added to the support from solution, the tin compounds can be deposited from aqueous solution or from nonaqueous solvents such as alcohols, hydrocarbons, ethers, ketones, and the like. Regardless of the manner of application, the particular tin compounds selected must have the capability of being convertible to either the stannous or stannic oxide form or to tin metal per se, as by conversion during calcination. Among the tin compounds which can be employed as a source for the tin or tin oxide in the support composition of this invention are the halides, nitrates, oxalates, acetates, propionates, tartrates, hydroxides, and the like. The use of stannous halides is particularly effective and convenient. The tin compounds are added to the support material in an amount sufficient to incorporate therein from about 0.01 to 5 weight percent of tin, based on weight of finished support. Throughout the specification the term "weight percent of support" means parts by weight per 100 parts by weight of support. Preferably, the tin compound will be present in an amount in the range of about 0.1 to about 2 weight percent, calculated as tin metal. Thus, according to this invention, an intimate mixture comprising at least one of the enumerated supports and at least one tin compound is calcined for about 1 to 100 hours at temperatures in the range of about 600–2500° F. Preferred supports are those prepared from calcining the support composite for about 2–50 hours at about 800–1850° F.

The novel catalysts of the invention comprise at least one Group VIII metal or metal compound capable of reduction in combination with the tin-modified supports of the invention. The Group VIII metals include nickel, platinum, ruthenium, palladium, iridium, or osmium, including compounds of such metals which are capable of reduction, e.g., nickel nitrate, and including mixtures thereof. The Group VIII metal content of the catalyst should be in the range of 0.1 to 5 weight percent, preferably 0.1 to 1 weight percent of the support. In addition to the Group VIII metals, the catalyst composition can include activating components such as Group I–A and II–A alkali metal and alkali earth metal compounds as well as tin, germanium and lead. Preferred catalysts are those which have the Group VIII metal compound in combination with a tin compound deposited upon the tin-modified calcined support. The amount of tin in this embodiment is in the range of 0.01 to 5 weight percent, preferably 0.01 to 1 weight percent and is in addition to the amount of tin already incorporated into the tin-modified support. The tin component can be deposited with the Group VIII metal components upon the catalytic carrier material of the invention separately or together by any manner known to the art such as by deposition from aqueous and nonaqueous solutions of tin halides, nitrates, oxalates, acetates, carbonates, propionates, tartrates, bromates, chlorates, oxides, hydroxides and the like. For example, the tin compounds can be admixed in solution with the Group VIII metal component and simultaneously deposited upon the catalytic carrier, as from a aqueous solution of chloroplatinic acid and stannous chloride. Stannous halides are particularly effective and convenient as a source of tin.

Since nonacidic catalysts are desirable in many applications, the novel catalysts of the invention can be treated with sufficient alkali metal or alkaline earth metal compound or compounds in order to neutralize the acid sites of the catalyst composite including the metal and support in order to leave the deposit alkaline and to activate the catalyst for subsequent use, e.g., in the dehydrogenation of steam-diluted organic feed material. The optimum amount of alkali or alkaline earth metal compound or combination of compounds can be determined experimentally; generally, an amount in the range of 0.5 to 10 weight percent of the total catalyst is effective.

Generally speaking, the Group VIII metal compound and the adjuvants such as alkali or alkaline earth metal and/or tin compounds which are deposited on the tin-modified carirer to form the novel catalyst of the invention can be any compound in which the moieties, other than the desired catalyst components and oxygen, can be volatilzed during heating or calcination. The catalytic materials can be sequentially combined with the support in any order or, for convenience, can be applied simultaneously in a single impregnation operation. After impregnation, the catalyst composites are preferably dried and can be calcined, if desired.

The catalytic agents of this invention have been found to be particularly suitable for use in dehydrogenation processes. Thus, in accordance with the present invention the organic feedstock is contacted in the presence of steam and in the absence of elemental oxygen under dehydrogenation conditions with a heretofore described catalyst of this invention.

The catalytic dehydrogenation processes of this invention are effected at temperatures in the range of about 800° F. to about 1300° F., preferably in the range of 950° to 1100° F., with the exact conditions being dependent on the feedstock and product desired. Pressures are generally in the range of about 0 to 400 p.s.i.g., preferably 75 to 150 p.s.i.g., and the space velocity is in the range of 300 to 1800 volumes of feedstock per volume of catalyst per hour (GSHV), preferably in the range of 1000 to 1300. The reactions of the invention are carried out in the vapor phase in the presence of steam and in the absence of oxygen at molar ratios of steam to organic feedstock in the range of 2–30:1, preferably 4–10:1. In the processes of the invention, when the ratios of steam to organic feedstock and pressures in the lower portion of the specified ranges are employed, the appropriate space velocities are preferably lower. Thus, for example, when pressure is in the range of 0 to 50 p.s.i.g. and the molar ratio of steam to organic feedstock is in the range of 2–10:1, space veloccity is preferably in the range of 300 to 1000.

The processes of the invention are particularly well adapted to the dehydrogenation of various organic compounds containing at least one

grouping, i.e., adjacent carbon atoms singly bonded to each other and each attached to at least one hydrogen atom. In addition to carbon and hydrogen, these compounds can also contain oxygen, halogen, nitrogen and sulfur. Such compounds can contain from 2 to 20 carbon atoms, preferably 2 to 12 carbon atoms. Among the class of organic compounds which can be treated according to the processes of this invention are alkanes, alkenes, alkyl halides, ethers, alkyl aromatic compounds, alkyl heterocyclic, cyanoalkanes, cyanoalkenes, and the like. The catalyst composition of this invention is particularly effective for the dehydrogenation of $C_2$ to $C_9$ paraffins, $C_4$ to $C_8$ monoolefins and $C_8$ to $C_{16}$ alkylbenzenes. The product can be recovered from the reaction effluent in any known manner such as by fractional distillation.

During the dehydrogenation reaction, the catalyst, which can be any suitable form such as granules, pills, pellets, spheres and the like, will slowly lose some activity and will periodically require regeneration, which can be effected by any means known to the art. In one regeneration method, the feedstock is cut off and the catalyst is treated with steam-diluted air, such that the oxygen content of the mixture is about 1–2 mol percent, with the remainder being steam and/or inert gases such as nitrogen, helium, methane, and the like. The regeneration treatment can be carried out at temperatures and pressures within the dehydrogenation operating range for about 15 minutes to about 1 hour.

The following examples are illustrative of the invention. Example 1 demonstrates a method for preparing the supports of this invention. Example 2 demonstrates a method for the preparation of a composite catalyst including the support of the invention. Examples 3 and 4 are representative processes for the dehydrogenation of n-butane according to the invention. Example 5 is a comparison dehydrogenation process using a catalyst not included within the scope of the invention. Example 6 is directed to the preparation of a catalyst according to the invention for use in an extended evaluation test (Example 7).

EXAMPLE 1

Preparation of support

To a slurry of 51 g. of finely divided alumina in 270 ml. of distilled water is added 43.5 g. of finely divided reagent grade zinc oxide and 1.2 g. of finely divided reagent grade stannic oxide. The mixture is stirred for approximately 50 minutes to form a stable homogeneous slurry. The slurry is dried overnight in a forced draft oven at 120° C. After cooling, the dried support is sieved to 14–40 U.S. mesh and calcined in air in a muffle furnace which is programmed as follows: 1 hour at 800° F., 1 hour at 1000° F., 1 hour at 1100° F., and 3 hours at 1850° F. The thus-prepared support has a surface area of 11.5–11.8 m.$^2$/gm., a pore volume of 0.40 cc./gm. and an apparent bulk density (ABD) of 0.70 gm./cc. The support contains 27.6 weight percent alumina, 38.0 weight percent zinc and 1.0 weight percent tin.

EXAMPLE 2

Preparation of catalyst

Portions of the catalyst support from Example 1 are impregnated with platinum from an aqueous solution of chloroplatinic acid to form catalyst compositions containing 0.2 weight percent platinum, 0.4 weight percent platinum and 1.0 weight percent platinum, respectively. After soaking in the aqueous platinum solution and drying under a heat lamp, the catalysts are ready for use.

EXAMPLE 3

The catalyst of Example 2 containing 0.2 weight percent platinum as the sole impregnant on the

base is evaluated in the dehydrogenation of n-butane in four consecutive 22-hour cycles with intermediate air regeneration. The cycles comprise a regeneration portion and a conversion portion. Each cycle is initiated with the regeneration portion comprising passing a nitrogen flush for 5 minutes, then steam and air for 20 minutes, then a nitrogen flush for 5 more minutes at reaction temperature. The results of these evaluation runs are set forth in Table I.

TABLE I

Feed—n-butane
Reaction conditions:
 Temperature—1,035–1,045° F.
 Pressure—85 p.s.i.g.
 Space velocity—1,100 GHSV
 Steam/n-butane mol ratio—5.5:1

| | Run | | | | | | | |
|---|---|---|---|---|---|---|---|---|
| | 1 | | 2 | | 3 | | 4 | |
| On cycle time, hrs.[1] | 0.5 | 22.5 | 0.6 | 22.7 | 0.6 | 22.3 | 0.6 | 22.5 |
| Conversion, percent | 36.4 | 20.9 | 38.0 | 26.7 | 37.2 | 22.7 | 38.0 | 28.3 |
| Selectivity, percent: | | | | | | | | |
| Cracking | 2.3 | 4.7 | 3.4 | 2.7 | 3.7 | 2.3 | 3.7 | 3.1 |
| Water gas | 1.3 | 1.8 | 1.6 | 1.4 | 1.7 | 1.1 | 1.2 | 1.1 |
| Butenes | 93.3 | 85.2 | 90.8 | 90.5 | 91.2 | 90.5 | 91.7 | 91.6 |
| Butadiene | 3.1 | 8.3 | 4.2 | 5.4 | 3.4 | 6.1 | 3.4 | 4.2 |
| Rate of activity decline, percent/hr | 0.7 | | 0.5 | | 0.7 | | 0.5 | |

[1] From beginning of conversion portion of cycle.

This example demonstrates the effectiveness of the catalysts of the invention as dhydrogenation catalysts. Particularly of interest is the continued high conversion and selectivity to butenes and butadiene, the regenerability of the catalyst and the low rate of activity decline.

EXAMPLE 4

The catalyst of Example 2 containing 0.4 weight percent platinum as the sole impregnant on the Zn–Al$_2$O$_4$–Sn base is evaluated according to the procedure in four consecutive 22-hour on stream cycles as in Example 3 with intermediate air regeneration. The results of these runs are set forth in Table II.

TABLE II

Feed—n-butane
Reaction conditions:
 Temperature—1,035–1,045° F.
 Pressure—85 p.s.i.g.
 Space velocity—1,100 GHSV
 Steam/n-butane mol ratio—6:1

| | Run | | | | | | | |
|---|---|---|---|---|---|---|---|---|
| | 1 | | 2 | | 3 | | 4 | |
| On cycle time, hrs | 0.5 | 22.8 | 0.4 | 20.9 | 0.6 | 22.0 | 0.8 | 18.5 |
| Conversion, percent | 39.5 | 28.0 | 40.9 | 30.6 | 41.6 | 33.4 | 44.9 | 37.5 |
| Selectivity, percent: | | | | | | | | |
| Cracking | 3.0 | 1.8 | 2.9 | 2.4 | 3.4 | 2.5 | 2.8 | 2.5 |
| Water gas | 2.1 | 1.3 | 1.0 | 1.8 | 2.2 | 1.9 | 2.2 | 1.3 |
| Butenes | 92.0 | 92.0 | 91.8 | 90.6 | 91.1 | 91.5 | 90.7 | 91.2 |
| Butadiene | 2.9 | 4.9 | 3.3 | 5.2 | 3.3 | 4.1 | 4.3 | 4.6 |
| Rate of activity decline, percent/hr | 0.5 | | 0.5 | | 0.4 | | 0.4 | |

Of particular interest is the lower initial cracking activity the catalyst of this invention at a higher platinum concentration.

EXAMPLE 5

A calcined support consisting essentially of zinc aluminate spinel is prepared as in Example 1 except that no tin compound is employed. This support is impregnated with 0.4 weight percent platinum as in Example 2 and with 1.0 weight percent tin concurrently. The tin is impregnated as stannic chloride. The impregnated catalyst is then dried.

Runs are made under conditions as in Example 4 with the following results.

TABLE III

| | Cycle | | |
|---|---|---|---|
| | 1 | 2 | 3 |
| On cycle time, hrs | 0.6  5.2 | 0.6  8.1 | 0.6  7.6 |
| Conversion, percent | 37.3  23.8 | 37.7  22.6 | 36.3  24.5 |
| Selectivity, percent: | | | |
| Cracking | 1.6  1.9 | 1.3  2.0 | 2.1  2.4 |
| Water gas | 0.8  0.8 | 1.0  0.8 | 1.0  1.0 |
| Butenes | 93.2  90.7 | 92.7  90.2 | 92.4  90.5 |
| Butadiene | 4.4  6.6 | 4.0  7.0 | 4.5  6.1 |
| Rate of activity decline, percent/hr | 2.94 | 2.01 | 1.69 |

This control example in comparison to Example 4 demonstrates that a catalyst wherein tin is not incorporated into the support prior to calcination has a substantially higher rate of decline in activity. Thus, the catalysts of the instant invention are demonstrated to be substantially more resistant to deterioration in service.

EXAMPLE 6

A catalyst comprising a platinum compound deposited upon a zinc aluminate spinel support containing 1 percent Sn is prepared by the following procedure:

(1) 1700 gms. finely divided alpha-alumina is slowly added to 7 liters of deionized water while stirring slowly over a 35-minute period;

(2) 1450 gms. of particulate reagent grade zinc oxide is added with vigorous stirring, followed by addition of 40 gms. of particulate reagent grade stannic oxide while stirring continued;

(3) The resulting slurry is milled in a ball mill for 1 hour;

(4) Portions of slurry are poured into shallow pans and dried overnight to a hard cake in air in a forced draft oven at 110° C.;

(5) The dried portions are ground and screened to <40 U.S. mesh powder, 6 percent polyethylene binder (187 gms.) is added and the resulting mixture is tableted to approximately 12 lb. crush strength ¼″ x ⅛″ tablets;

(6) The tablets are calcined at 1850° F. overnight in air in a muffle furnace;

(7) The calcined tablets are ground to suitable particle size for use;

(8) The tin-containing zinc aluminate base is impregnated to contain 0.4 wt. percent platinum using an aqueous solution of chloroplatinic acid; and (9) The catalyst composite is dried under heat lamp, then calcined in air for 3 hours at 1050° F. The catalyst is then ready for use.

EXAMPLE 7

A 9.8 gm. portion of 20–40 U.S. mesh catalyst of Example 6 having 0.4 percent Pt on Zn—Al$_2$O$_4$ containing 1 percent Sn is evaluated in a steam-air aging test continuously for 2816 hours at 1040–1060° F., 0 p.s.i.g. 30–34 g./hr. steam and 10 liters/hr. of air. The activity of the catalyst for n-butane dehydrogenation is checked prior to aging and at intervals during the test by conducting butane dehydrogenation for short periods. No change is observed.

EXAMPLE 8

The 9.8 gm. portion of catalyst of Example 7 is transferred, still in the original tubular reactor, to an automated cyclic test unit where it is tested over a 3340-hour period. Cycles are 7.5 hours on steam and n-butane, preceded by 5 minutes of nitrogen flush, 20 minutes of air regeneration, and 5 minutes of nitrogen flush. Process conditions are 85–95 p.s.i.g., 1050° F., 1200–1300 GHSV n-butane, and 6/1 steam to n-butane mol ratio. A summary tabulation of this test is given below.

TABLE IV.—N-BUTANE DEHYDROGENATION OVER 0.4% PT ON ZINC ALUMINATE CONTAINING 1% SN

Conditions:
1,050° F.
90 p.s.i.g.
1,200–1,300 GHSV of n-butane
6/1 steam/n-butane mol ratio
Sampled at 0.5 hour into conversion portion of each cycle

|  | Cycle | | | | | | |
|---|---|---|---|---|---|---|---|
|  | 21 | 100 | 193 | 241 | 313 | 385 | 403 |
| Conversion, percent | 44.7 | 43.0 | 42.2 | 40.1 | 40.8 | 35.9 | 30.5 |
| Selectivity, percent: | | | | | | | |
| Cracked | 4.2 | 3.3 | 2.9 | 3.0 | 2.3 | 2.5 | 2.7 |
| Water gas | 1.7 | 1.2 | 1.0 | 1.0 | 0.9 | 0.8 | 0.7 |
| Butenes | 89.7 | 91.0 | 91.0 | 91.1 | 91.7 | 91.6 | 90.7 |
| Butadiene | 4.4 | 4.5 | 5.1 | 4.9 | 5.1 | 5.1 | 5.9 |
| Total dehydrogenation, percent (butenes and butadiene) | 94.1 | 95.5 | 96.6 | 96.0 | 96.8 | 96.7 | 96.6 |
| Hours, cyclic | 222 | 859 | 1,603 | 1,987 | 2,563 | 3,139 | 3,282 |
| Total hours (including steam and air) | 3,038 | 3,675 | 4,419 | 4,803 | 5,379 | 5,955 | 6,098 |

This example demonstrates that a catalyst prepared according to this invention has good activity over a long life.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

That which is claimed is:

1. A dehydrogenation catalyst consisting essentially of a Group VIII metal or an oxide thereof on a carrier consisting essentially of zinc aluminate spinel containing tin or an oxide of tin, prepared by a process which comprises; forming said carrier by admixing alumina, zinc oxide, and a tin compound capable of being converted to tin metal or an oxide of tin, said tin compound being present in an amount sufficient to provide in the finished carrier from 0.01 to 5 weight percent tin calculated as free metal and based on the total weight of the finished carrier; calcining said mixture at a temperature of 600–2500° F.; impregnating said tin-containing catalyst carrier with 0.1–5 weight percent, based on the weight of the total catalytic composition, with a Group VIII metal compound capable of being converted to the aforesaid Group VIII metal or an oxide thereof, said Group VIII metal selected from the group consisting of nickel, platinum, ruthenium, pallium, iridium, osmium, or mixtures thereof; and calcining said metal compound impregnated, tin-containing zinc aluminate spinel carrier to form said catalyst.

2. A catalyst according to claim 1 wherein said tin compound is present in an amount sufficient to provide in the finished carrier about 0.1 to about 2 weight percent tin.

3. A catalyst according to claim 1 wherein the temperature of said first calcination is in the range of 800 to 1850° F.

4. A catalyst according to claim 2 wherein the temperature of said first calcination is in the range of 800 to 1850° F.

5. A catalyst according to claim 1 wherein said Group VIII metal is platinum.

6. A catalyst according to claim 3 wherein said Group VIII metal is platinum.

References Cited

UNITED STATES PATENTS

| 3,365,482 | 1/1968 | Khoobiar | 252—463 |
| 2,480,494 | 8/1949 | Mathy | 252—463 |
| 2,331,292 | 10/1943 | Archibald et al. | 252—463 |
| 3,511,888 | 5/1970 | Jenkins | 260—683.3 |
| 3,531,543 | 9/1970 | Clippinger | 252—466 PT |
| 3,461,177 | 8/1969 | Box Jr. et al. | 260—683.3 |
| 3,461,183 | 8/1969 | Hepp et al. | 260—683.3 |

DANIEL E. WYMAN, Primary Examiner

P. E. KONOPKA, Assistant Examiner

U.S. Cl. X.R.

252—442, 459, 460, 461, 463, 466 PT, 472, 473; 260—666, 669, 680, 683.3, 696